(12) United States Patent
Tyler

(10) Patent No.: US 6,224,083 B1
(45) Date of Patent: May 1, 2001

(54) MULTI-FUNCTION LOAD BEARING APPARATUS

(75) Inventor: Terry Edward Tyler, West Dummerston, VT (US)

(73) Assignee: JBT Manufacturing Corporation, Bedford, NH (US)

( * ) Notice: Subject to any disclaimer, the term of this patent is extended or adjusted under 35 U.S.C. 154(b) by 0 days.

(21) Appl. No.: 09/405,785

(22) Filed: Sep. 27, 1999

(51) Int. Cl.$^7$ .................................................. B62D 53/04
(52) U.S. Cl. ................................. 280/476.1; 280/405.1; 180/209
(58) Field of Search .................... 280/476.1, 405.1, 280/411.1, 767, 124.179, 33.997, 404, 491.5, 495; 224/405, 457; 180/209

(56) References Cited

U.S. PATENT DOCUMENTS

| | | | |
|---|---|---|---|
| 2,303,246 | 11/1942 | Nelson | 280/33 |
| 2,379,265 | 6/1945 | Whitmer | 280/33 |
| 2,381,190 | 8/1945 | Tiner et al. | 280/33 |
| 2,385,099 | 9/1945 | Nelson | 280/33 |
| 2,506,718 | 5/1950 | Grant | 280/33 |
| 2,515,705 | 7/1950 | Gradiner | 280/33 |
| 2,570,482 | 10/1951 | Pruitt | 280/33 |
| 2,634,986 | 4/1953 | McDaniel | 280/33 |
| 3,345,081 | 10/1967 | Hartwig | 280/476 |
| 3,865,405 | 2/1975 | Mitchell et al. | 280/476 |
| 4,253,679 | 3/1981 | Sargent | 280/405 |
| 4,491,338 | * 1/1985 | Sheldrake | 280/405.1 |
| 4,871,183 | * 10/1989 | Moss | 280/475 |
| 5,593,270 | * 1/1997 | Richards | 414/458 |
| 5,620,198 | * 4/1997 | Borchers | 280/507 |
| 5,727,804 | * 3/1998 | Metzger | 280/476.1 |
| 5,727,920 | * 3/1998 | Hull et al. | 414/476 |
| 5,860,670 | * 1/1999 | Aubin | 280/476.1 |
| 5,950,890 | * 9/1999 | Darby | 224/402 |

* cited by examiner

*Primary Examiner*—Kevin Hurley
(74) *Attorney, Agent, or Firm*—Devine, Millimet & Branch; Paul C. Remus; Kristin Kohler

(57) ABSTRACT

A multi-functional, compound apparatus that functionally provides at least one additional axle and wheels, that can be used with or without a trailer being towed to enable a vehicle to carry extra weight, extra long loads, and/or to tow a trailer heavier than the tow vehicle could otherwise safely tow is disclosed. The apparatus provides the additional payload carrying and towing capacity while maintaining the driving and steering capability of the tow vehicle, and removing the majority of the weight of the load from the rear portion of the tow vehicle. The apparatus may be used as a load bearing and distributing trailer hitch, or simply as a load bearing member to increase the payload capability of a carrying vehicle, or may be adapted to be used as a trailer itself.

12 Claims, 3 Drawing Sheets

MULTI-FUNCTION LOAD BEARING APPARATUS

FIELD OF THE INVENTION

This invention relates to a multi-functional towing and load bearing apparatus to allow a vehicle to carry or tow heavy loads. More particularly, the invention relates to a multi-functional towing and load bearing apparatus that provides functionally at least one additional detachable wheel axle assembly, usable with or without a trailer being towed. The device enables a vehicle to carry a load in excess of its original safe driving limits, carry extra long loads, and/or tow a trailer heavier than the tow vehicle could otherwise safely tow according to the tow vehicle's manufacturer's specifications. All the while, the tow vehicle is enabled to maintain the driving and steering capability by removing the majority of the weight of the load from the rear portion of the tow vehicle. The apparatus is securely connectable to the frame of a tow vehicle, whether directly, or by way of using a universal hitch mechanism.

BACKGROUND

Trailer dollies that carry most of the weight of the front end of a trailer have long been known. Trailers such as mobile homes, campers, and livestock carriers are quite heavy in tongue-weight and they place a great load on the rear end of the tow vehicle. This excessive weight on the rear of the tow vehicle puts a great deal of strain on the rear tires, axle, springs, and shocks of the tow vehicle. In addition, having a heavy load attached to the rear of the tow vehicle may actually cause weight to be removed from the front of the tow vehicle, resulting in control deficiencies, including breaking and steering problems, especially at highway speeds.

In addition, especially when the control of the front end of the vehicle is compromised, wind from weather or passing vehicles may cause the trailer to sway. When the trailer is connected directly to the tow vehicle, the sway of the trailer can push and pull the tow vehicle or trailer or both, and cause the driver to lose control of the vehicle and trailer.

Most conventional trailer dollies save wear and tear on the tow vehicle, promote safe traction even at highway speeds, and equalize and balance the load of the trailer. In addition, many conventional dollies also serve as a stand for the trailer when unhitched from a tow vehicle, eliminating the necessity of jacking up the trailer when unhitched.

While the conventional dollies all, to one degree or another, stabilize and equalize the load of the trailer to provide increased control and safety for the tow vehicle, all of the known dollies are designed exclusively to be used with the trailer. None is capable, by itself, of relieving and redistributing a load carried in or by the tow vehicle, as opposed to a load being pulled by a tow vehicle.

Many people today, including "do-it-yourselfers" or construction contractors, routinely load their passenger cars and trucks with very heavy and/or long loads that weigh down the back of the vehicle. Loading the vehicle in this way presents many of the same problems presented when towing a heavy trailer. Strain is put on the rear of the vehicle and there may be a consequential loss of steering and breaking control in the front of the vehicle, and, with today's front wheel drive cars, even a loss of power, if significant weight is taken off the front wheels.

Thus, there is a need for a support mechanism to take the weight of excessively loaded vehicles and redistribute it to provide safety, control, and additional carrying capacity to a vehicle. In addition, there is a need for a device that can function in multiple ways, as a load bearing attachment, as a trailer connection, an attachment capable of connecting to a towed trailer, and capable of carrying its own load or portion of a vehicle load for those who do not own trailers to carry heavy and/or long materials that do not fit entirely in their car or truck.

SUMMARY

In accordance with the present invention, a multi-functional load bearing apparatus is provided which is comprised of a hitch extension member having a connection that (a) will receive a conventional style hitch (b) be connectable to the receiving opening of a conventional or universal receiver style hitch, or which may be attached directly to the frame of the tow vehicle, (c) has a receiving end that can receive the hitch ball portion of a conventional trailer hitch; (d) a frame member connected perpendicularly to the hitch extension member, and (e) a road engaging wheel assembly attached to the frame member and having at least one pair of axle members, each axle member mounting a wheel, the wheels being laterally spaced and having coincident axes of rotation.

The apparatus has a spring support unit connected to each axle member and to its frame member, to absorb shock caused by travel over uneven surfaces. The springs used in the invention are adjustable to accept the weight of different load requirements. The compression and strength of the spring support members are adjustable by a mechanism disposed at the top of each spring support member on the road engaging wheel assembly. The mechanism may be rotatable and is adjustable to tighten or loosen the compression of each spring support member to adjust each spring to accommodate different weights. As an alternative to an adjustable spring, the type and strength of the spring support members may be optionally selected by changing spring support members depending on the type of load to be carried or towed, with different spring support members used depending on the different load requirements.

There is also a series of through holes or openings in the hitch extension member, at both the connection end and the hitch receiving end, and pins insertable in the holes, to attach the apparatus to a tow vehicle, and to attach a conventional hitch ball to the apparatus if it is desired to tow a trailer using the apparatus of the invention. In addition, there is a slidable sheath member that encloses, protects and strengthens the connection end of the hitch extension member that connects to the tow vehicle.

The frame member may have a jack stand attachment portion such that a jack stand is attachable to raise the apparatus if need be, for example to change a tire, and to enable the apparatus to be self supporting when not in use or hitched to a tow vehicle or trailer.

There may also be an extended trailer bed attachable to the connection end of the hitch extension member and which rests on the frame member such that the apparatus is effectively convertible into a trailer itself. In addition, there may be a height adjustable long load support member that is attachable to the receiving end of the hitch extension member to enable a vehicle to carry extra long loads. The long load support member is adjustable in height to support extra long loads at either the height of a van or truck bed, or station wagon bed, or at the height of a car or truck's roof or roof rack. The long load support is attachable at the hitch receiving end of the hitch extension member, in the receiving opening where a conventional trailer hitch would be attached. The long load support may be used with or without the extended trailer bed.

The apparatus may also have protective fenders attached to the frame member to cover and protect a portion of each wheel. In addition, the apparatus may have a braking mechanism installed at each wheel and controlled by the tow vehicle and may have tail reflectors, mud flaps, license plate holder, and/or tail lights electrically connected to the tow vehicle.

The invention is not a tow bar, or solely a hitch, a trailer or solely an extra axle, but rather is a multi-function apparatus. Thus the invention provides a multi-purpose load bearing apparatus that is relatively small and easy to handle, and is significantly less expensive to manufacture and purchase than a trailer dolly, trailer, and additional rear support mechanisms would be to purchase separately.

The invention provides an apparatus that carries and redistributes the weight of a load, whether the load is being carried in a vehicle, or being towed by a vehicle, such that the strain is removed from the rear portion of the vehicle, thus enhancing traction, control, and safety of the vehicle.

The invention also provides the multiple capability to tow a trailer, simply support the rear portion of a loaded vehicle to increase the payload carrying capability of the vehicle, or to become a trailer itself.

In addition, the invention provides an apparatus that is adaptable for use with a variety of standard receiver type hitches, for a variety of tongue weight capacity hitches and receivers such as REESE® hitches, Draw-Tite® type hitches. The apparatus is also adaptable to be secured to any type of custom made hitch, or to be secured to the frame of the vehicle.

A key aspect of the invention is that the invention is secured fixedly to the towing or load-bearing vehicle such that the apparatus does not swivel with respect to the tow vehicle but rather tracks with the tow vehicle.

The invention provides a height adjustable device that is usable with a variety of towing and load bearing vehicles.

The invention also provides an apparatus that can support the weight of both long and heavy loads such as dry wall, pipes, or timber, and allow a standard passenger car, van, or pickup truck to carry such loads that they would not otherwise be able to safely carry.

In addition the invention enables a tow vehicle to support a trailer with an excessive tongue weight, in excess of the tow vehicle's standard hitch capacity.

The invention also can function as a towing or dolly device itself, when unhitched, to move trailers by hand, in a lot for example, if need be, with an accessory handle attachable to enable the apparatus to be self-supporting when unhitched.

The invention may be adapted to carry or tow loads of various weight by selecting appropriate spring members of appropriate strength, or preferably by adjusting the compression of the spring members to accommodate various loads.

The invention also provides a device that can support and attach a variety of "fifth wheel" type apparatus for towing large trailers, thus providing additional versatility.

The invention provides the ability to enable a vehicle to distribute the weight of a load between the apparatus and the front and rear axles of the load carrying vehicle, wherein this was sometimes impossible in the past, and often resulted in dangerous conditions with the load hanging past the back of the vehicle, and too much weight removed from the front wheels of the vehicle, while there was needed but unused space in the interior of the vehicle.

The invention can be adapted to have a conventional trailer hitch or fifth wheel hitch attachable at the rear of the apparatus extending behind the apparatus, or at the frame member, between the wheels and not extending out behind the apparatus.

Other aspects of the invention will become apparent from a consideration of the following description when taken in connection with the appended claims and the accompanying drawings.

DETAILED DESCRIPTION OF THE PREFERRED EMBODIMENTS

Figure 1:
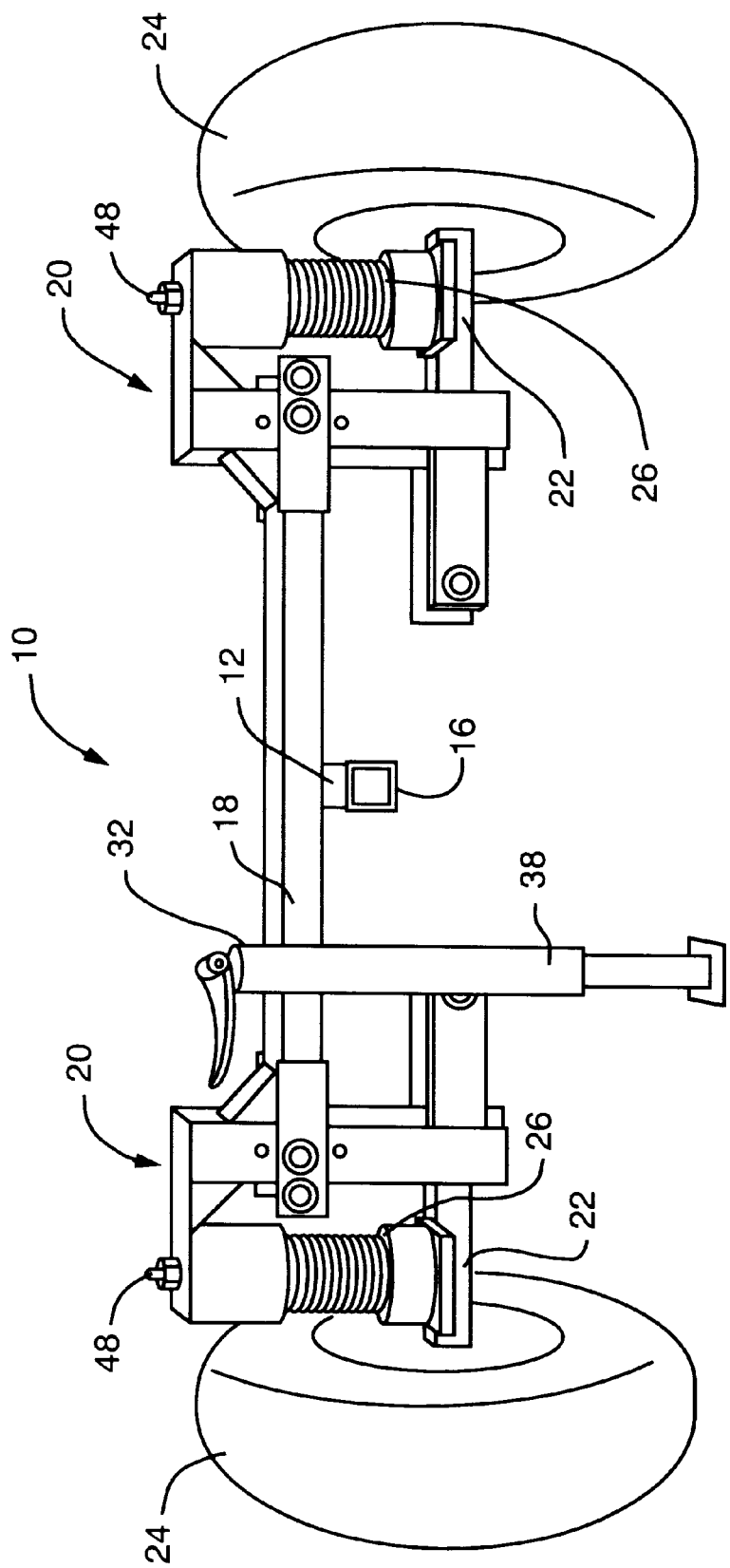
FIG. 1 is a plan view of the rear of the apparatus.
Figure 2:
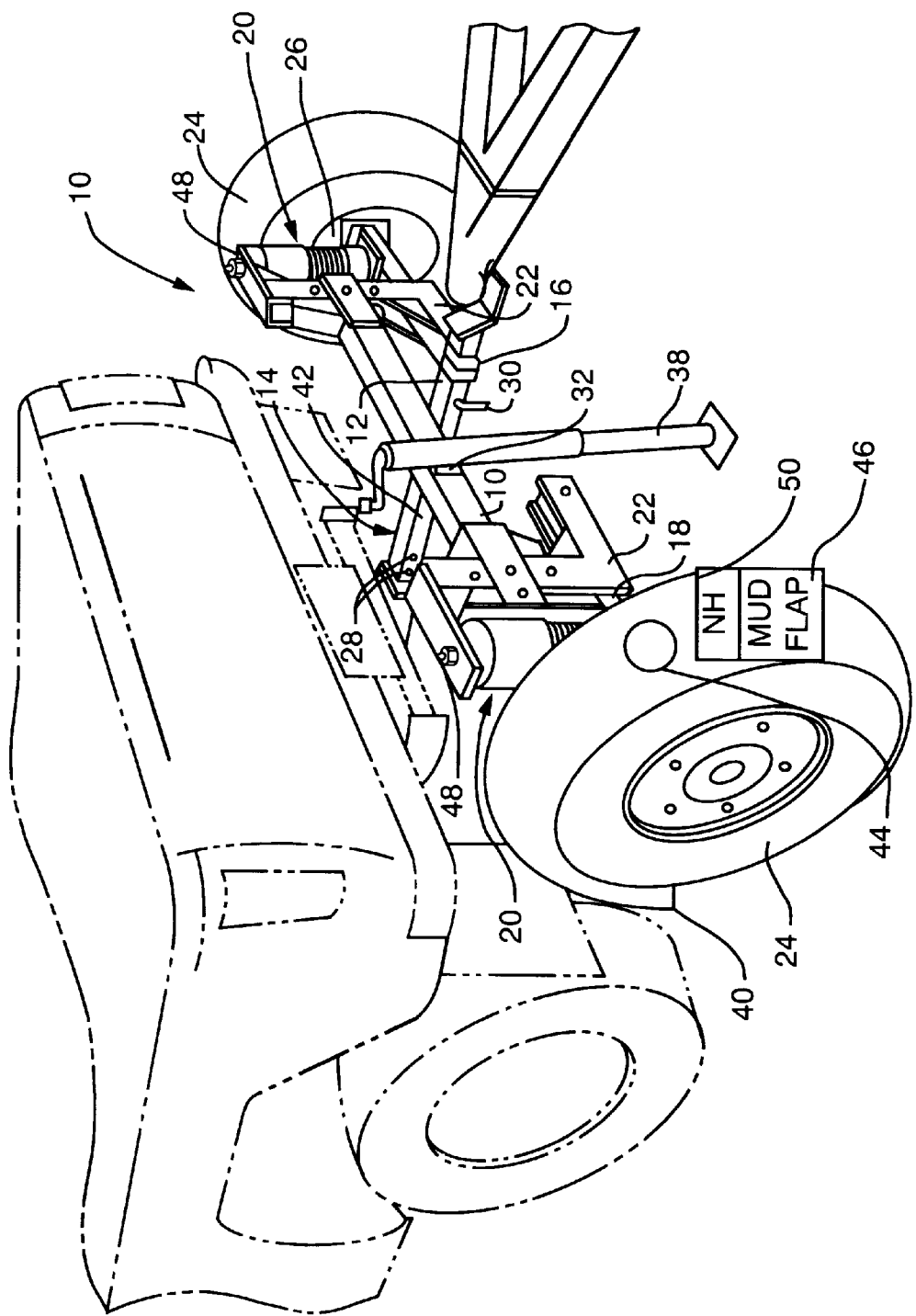
FIG. 2 is a perspective view of the apparatus attached to a tow vehicle.

Referring now to the drawings, in which like reference numerals refer to like elements throughout, FIGS. 1 and 2 show the multi-functional load bearing apparatus of the invention 10, comprising a hitch extension member 12 having a connection end 14 connectable to the receiving opening of a conventional receiver style hitch or connectable to a custom made hitch or to the frame of a tow vehicle, and a receiving end 16 that receives the hitch ball portion of a conventional trailer hitch, or other attachment, some of which are described in more detail below.

There is a frame member 18 connected perpendicularly to hitch extension member 12, and a road-engaging wheel assembly 20 attached to frame member 18 and having at least one pair of axle members 22, each axle member 22 mounting a wheel 24, the wheels 24 being laterally spaced and having coincident axes of rotation. The apparatus has a spring support member 26 connected to each axle member 22 and to the frame member 18, to absorb shock caused by travel over rough or uneven surfaces, and to help support the weight of a load. The type and strength of the spring support members 26 may be selected depending on the type of load to be carried or towed. Alternatively the compression and strength of spring support members 26 is adjustable by use of an adjustable mechanism 48, that may be rotatable, attached at the top of each spring member 26. The compression on each spring member may be increased or decreased as desired for the type of load to be supported, carried or towed.

There is also a series of holes or through openings 28 in the hitch extension member 12, at both the connection end 14 and the hitch receiving end 16, and pins 30 insertable in the holes, to attach the apparatus 10 to a tow vehicle, and to attach a conventional hitch ball to the apparatus 10 if it is desired to tow a trailer using the apparatus of the invention. Some of the through holes are shown in FIG. 2. In addition, there is a slidable sheath member 42 that encloses and protects the hitch connection end 14 of the apparatus 10, and covers the connection end 14 that connects to the tow vehicle.

The frame member 12 may have a jack stand attachment portion 32, as shown in FIGS. 1 and 2, such that a jack stand 38 is attachable to raise the apparatus 10 if need be, for example to change a tire. The jack also functions as an adjustable stand to enable the apparatus 10 to be self supporting when not in use, nor hitched to a tow vehicle or trailer. In addition, not shown, there may be an optional conventional dolly handle attachable to the hitch extension member at the connection end, for example by a pin and through holes, to enable the apparatus to be moved by hand, even when bearing a load.

Figure 3:
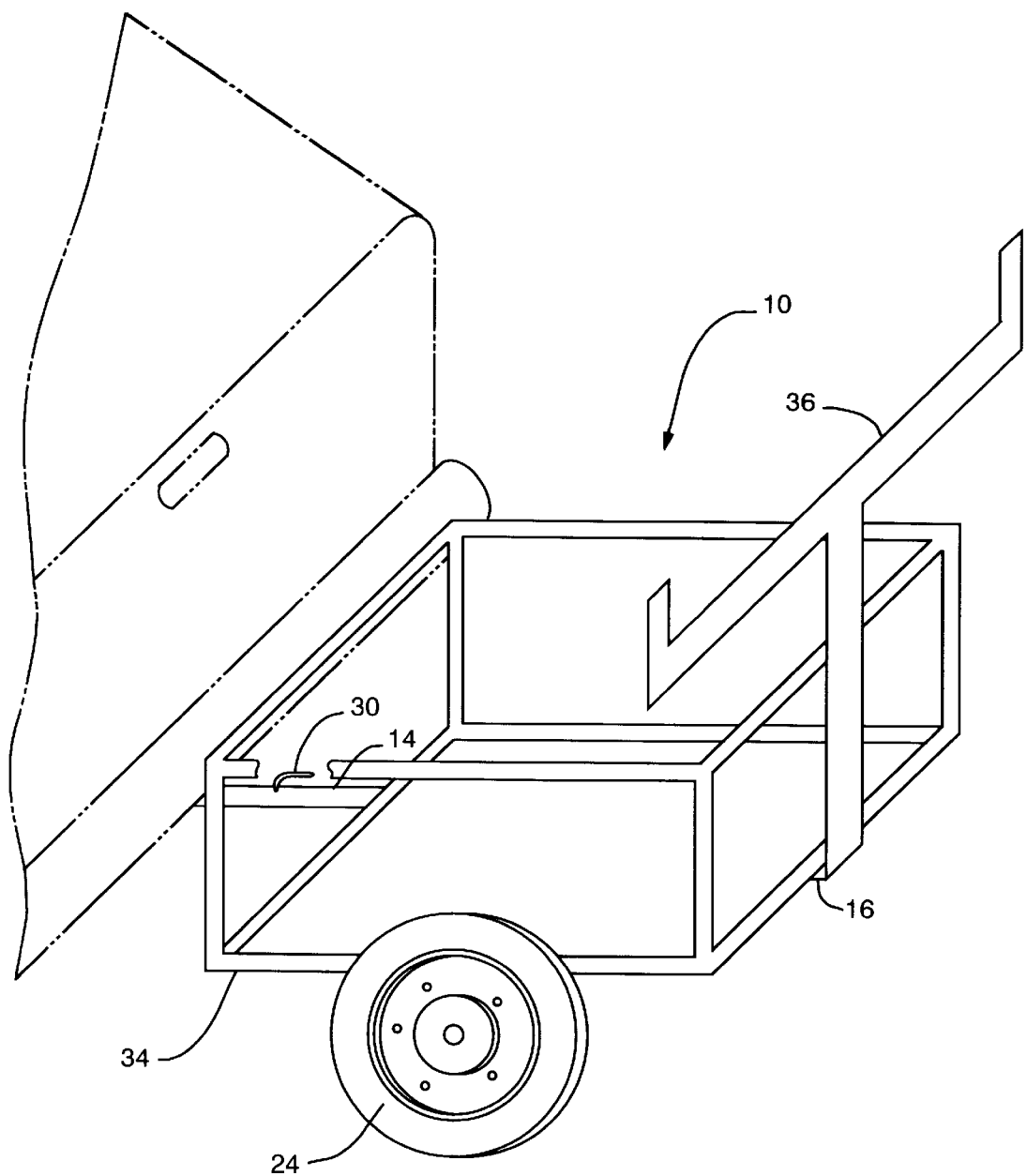
FIG. 3 is a side perspective view of the apparatus showing use of the extension trailer bed, and the long load support.

As shown in FIG. 3, the invention may also include an extended trailer bed 34 attachable, for example with a pin, to the hitch extension member 12 at the connection end 14 wherein trailer bed 34 effectively rests on frame member 18 such that the apparatus 10 is effectively convertible into a trailer itself. In addition, there may be a height adjustable long load support member or brace member 36 that is attachable to the frame member 12 to enable a vehicle to carry extra long loads. Long load support 36 may be attachable using through holes and pins or by any conventional method in which a hitch ball or other device would be attachable to a hitch receiver. The long load support member 36 is adjustable in height to support extra long loads at either the height of the back of a truck bed, or station wagon bed, or at the height of a car or truck's roof or roof rack. The long load support 36 is attachable at the hitch receiving end 16 of the hitch extension member, in the receiving opening where a conventional trailer hitch would be attached. The long load support 36 may be used with or without the extended trailer bed 34.

As shown in FIG. 2, the apparatus may also have protective fenders 40, (for ease of illustration only one fender is shown on the near wheel), to cover and protect at least a portion of each wheel, and tail lights or reflectors 44, or mud flaps 46, or a license plate holder 50 attached to fenders 40. The tail lights 44 would be electrically connected to the tow vehicle. There may also be a braking apparatus assembled and installed on the apparatus of the invention.

The invention is not a tow bar, or solely a hitch, but rather is a multi-functional apparatus. Thus the invention provides an apparatus to carry essentially all the vertical weight of a load being towed, actually redistributing the weight with even a slight upward pressure, or negative tongue weight, on the underside of the towing or load bearing vehicle, to enable a vehicle to carry or tow a payload well in excess of the vehicle's normal capacity, while eliminating wear and tear on the rear portion of the towing or carrying vehicle including the rear tires, wheels, axle, and suspension system, thereby enhancing safely and control of both the towing or carrying vehicle and the apparatus, whether the apparatus is used alone as a load increasing support, or as a trailer dolly or hitch, or as a trailer itself.

From the above non-limiting description, it can be seen that there may be modifications in the design, shape and use of the invention which are not described in detail, but which are within the scope of the invention as described above, and defined by the appended claims.

What is claimed is:

1. A load bearing multi-functional apparatus comprising:
   a rigid hitch extension member comprising a connection end rigidly connectable to a tow vehicle via a receiving opening of a receiver style hitch of the tow vehicle;
   a frame member connected perpendicularly to said hitch extension member; and
   a road engaging wheel assembly attached to said frame member having at least one pair of axle members, each axle member having an attached wheel, said wheels laterally spaced and having coincident axes of rotation.

2. The load bearing apparatus of claim 1 wherein said road engaging wheel assembly further comprises a spring support member connected to each said axle member and to said frame member, to absorb shock caused by travel over uneven surfaces.

3. The load bearing apparatus of claim 2 wherein spring support members of different strengths are attachable to said frame member and said axle member to carry loads of different weights.

4. The load bearing apparatus of claim 2 wherein each said spring support member is adjustable in strength by use of a mechanism to increase or decrease compression of each said spring support member, to accommodate loads of different weights.

5. The load bearing apparatus of claim 1 further comprising a receiving end that receives the hitch ball portion of a trailer hitch.

6. The load bearing apparatus of claim 5 further comprising a series of through openings in said hitch extension member at both said connection end and said receiving end, a pin insertable in said through openings in said connection end to secure said towing apparatus to the receiving opening of a receiver style hitch mounted on the tow vehicle, and a second pin insertable in said through openings in said receiving end to secure a hitch ball to said towing apparatus.

7. The load bearing apparatus of claim 1 wherein said frame member further comprises an attachment member to which a jack stand is mountable to raise at least a wheel of said load bearing apparatus off the ground if need be, and to enable said load bearing apparatus to be self supporting when not hitched to a tow vehicle.

8. The load bearing apparatus of claim 1 further comprising an extended trailer bed mountable on said frame member and connectable to said hitch extension member at said connection end such that said extended trailer bed rests on said frame member and said load bearing apparatus also functions as a trailer.

9. The load bearing apparatus of claim 5 further comprising a long load support member attachable to said hitch extension member at said receiving end which enables the tow vehicle to carry extra long loads.

10. The load bearing apparatus of claim 1 further comprising a protective fender attached to said frame member to protect and cover a portion of each said wheel.

11. The load bearing apparatus of claim 10 further comprising tail lights electrically connected to said tow vehicle and tail reflectors, both attachable to each said fender.

12. The load bearing apparatus of claim 1 further comprising a slideable sheath covering said connection end of said hitch extension member to add stability and strength to said hitch extension member at said connection end where said connection end is connectable to the receiving opening of a receiver style hitch of the tow vehicle.

* * * * *